J. C. ARNOLD.
ELECTRIC CURRENT CONTROLLER.
APPLICATION FILED JAN. 22, 1917 RENEWED AUG. 16, 1920.
1,408,967.
Patented Mar. 7, 1922.
4 SHEETS—SHEET 1.
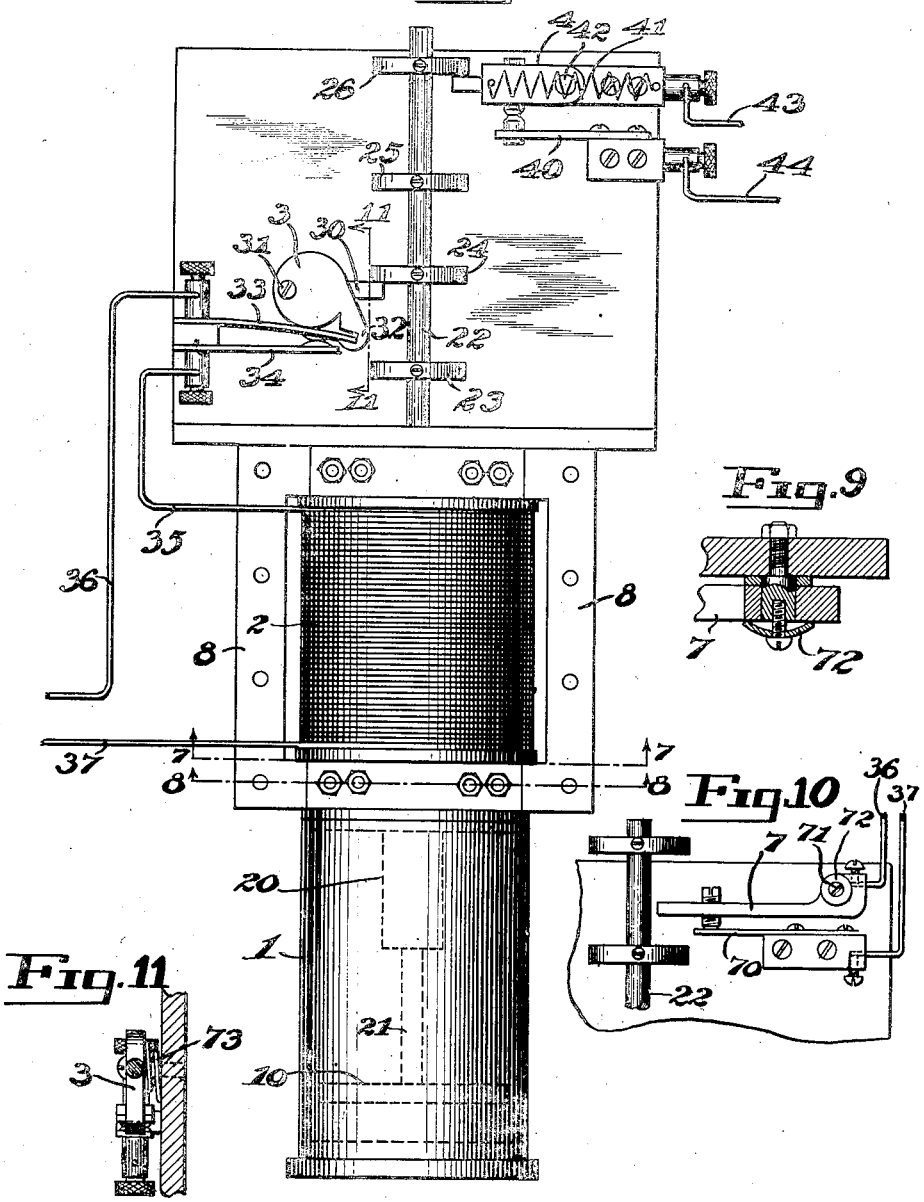

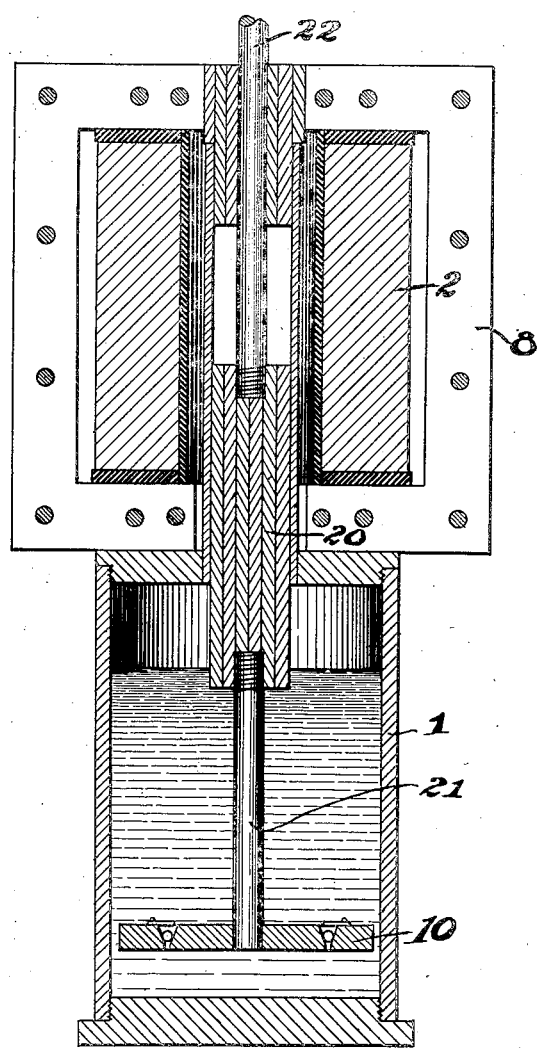

J. C. ARNOLD.
ELECTRIC CURRENT CONTROLLER.
APPLICATION FILED JAN. 22, 1917 RENEWED AUG. 16, 1920.
1,408,967.
Patented Mar. 7, 1922.
4 SHEETS—SHEET 3.
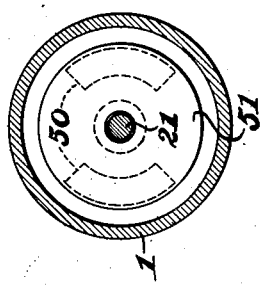
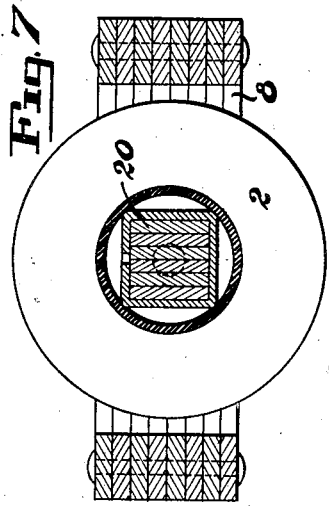
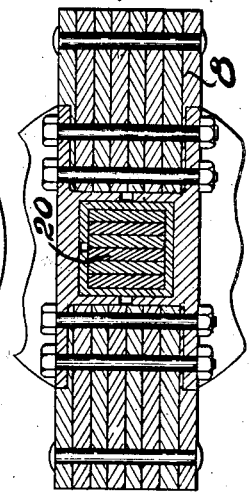
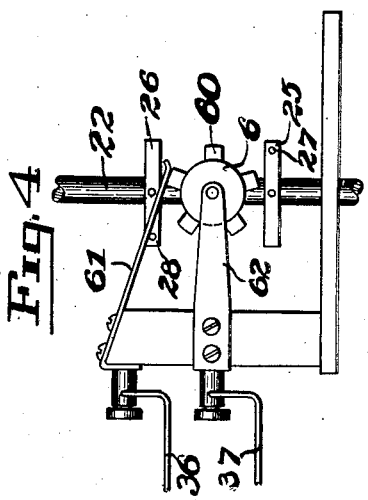
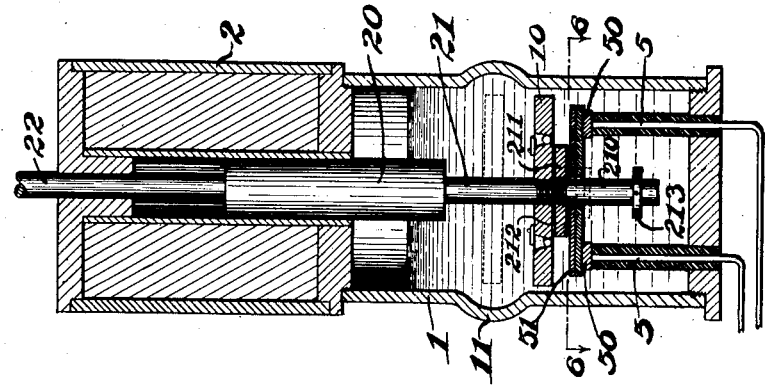
Inventor
James C. Arnold
By Henry L. Reynolds
Attorney J. C. ARNOLD.
ELECTRIC CURRENT CONTROLLER.
APPLICATION FILED JAN. 22, 1917 RENEWED AUG. 16, 1920.

1,408,967.

Patented Mar. 7, 1922.
4 SHEETS—SHEET 4.

Inventor
James C. Arnold
By Henry L. Reynolds
Attorney

UNITED STATES PATENT OFFICE.

JAMES C. ARNOLD, OF SEATTLE, WASHINGTON.

ELECTRIC-CURRENT CONTROLLER.

1,408,967.　　　　　Specification of Letters Patent.　　Patented Mar. 7, 1922.

Application filed January 22, 1917, Serial No. 143,668. Renewed August 16, 1920. Serial No. 403,824.

*To all whom it may concern:*

Be it known that I, JAMES C. ARNOLD, a citizen of the United States, and resident of the city of Seattle, county of King, and State of Washington, have invented certain new and useful Improvements in Electric-Current Controllers, of which the following is a specification.

My invention relates to a device which is capable of electrically producing a reciprocating movement, which device has directly associated therewith and controlled thereby, current making and breaking devices which control both the current which operates the device, and also a load circuit or circuits.

It also relates to means incorporated therein, whereby the time elapsing between the making and breaking of each circuit may be controlled and varied, and also means whereby the time relationship between these acts for different circuits may be controlled and varied.

The object of my invention is to produce a simple, reliable and accurate device which will produce the above results and which may be quickly and accurately adjusted to secure any of the variations in action of which it is capable.

The features of my device and the principles of its action will be herein set forth and the parts and combinations of parts which I consider to be novel and upon which I desire patent will be definitely stated in the claims.

In the accompanying drawings I have shown my invention as applied to the control of an electric load circuit in such a way as to produce alternating intervals of "on" and "off"; the same being such as are desired in the operation of intermittent illumination. It is, however, not to be understood that my invention is in any sense limited to such, or even analogous purposes.

Figure 1 is a side view or elevation of a type of construction which is particularly adapted for use with alternating currents.

Figure 2 is a longitudinal section through the solenoid which forms the actuating means for the device.

Figure 3 is a similar section showing a modified structure which is especially adapted for use with direct currents.

Figure 4 is a side view of the mechanism which is actuated by the solenoid for making and breaking the circuit.

Figure 5 is a view of the same parts from another angle.

Figure 6 is a section taken on the plane indicated by the broken line 6—6 of Figure 3.

Figure 7 is a section taken on the plane 7—7 of Figure 1.

Figure 8 is a section taken on the plane 8—8 of Figure 1.

Figure 9 is a section on a plane passing through the pivot axis of that type of spring friction device shown in Figure 10, which may be used to hold the switch bar 7 in set position.

Figure 10 is a front view of one type of switch mechanism by which one of the circuits may be controlled.

Figure 11 is an end view of the type of switch shown at 3 in Figure 1.

Figure 13:
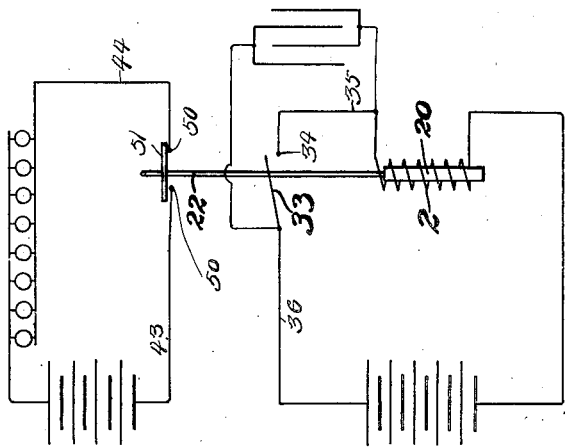
Figures 12 and 13 are diagrams showing the wiring diagrams, respectively, for alternating and direct current systems.
Figure 12:
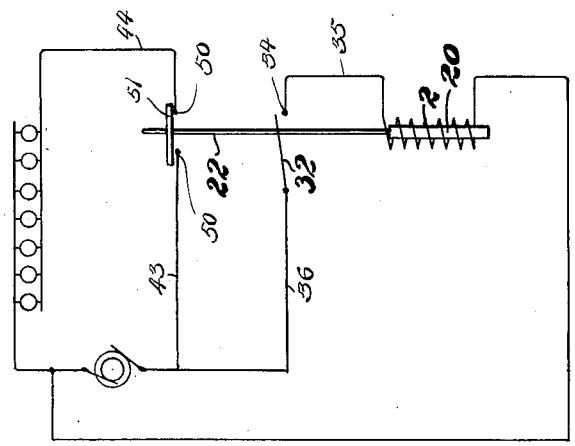

My device is applicable for any service wherein it is desired to regularly make and break an electric circuit. As the source of power for operating my device I employ a solenoid, and attach to this solenoid a means for delaying its action, which means, as herein shown, consist of a dash pot construction.

The moving of the solenoid core is relied upon to make and break a circuit, as to open and close a switch, or switches, as suitable regular intervals. This may be used to control the solenoid actuating circuit as well as one or more load circuits and said control may be adjusted differently for different circuits.

In the form of construction shown in Figure 1, 1 represents a cylinder in which is placed a supply of oil or other suitable liquid. Within this cylinder chamber is placed a piston disk 10, which is secured to an extension 21 from the core 20 of a solenoid, of which 2 represents the coil. The piston disk 10 either fits loosely within the cylinder, or has openings therein, or a combination of both, as may be convenient or desired, whereby the solenoid may be enabled to move it back and forth through the oil and at a speed much less than would occur if no resistance of this sort were provided. The extent of this resistance and the slowing up of movement retardation thus produced, may be varied to suit the requirements of special cases.

To the other end of the solenoid core is connected a rod 22, by the movement of which the circuit controlling devices are actuated. As herein shown this has connected therewith members which are adapted to engage and operate two switches. These members are herein shown as bars 23, 24, 25, and 26. The bars 23 and 24 alternately engage with a finger 30 of a member 3, which is pivoted at 31 and which acts as an eccentric, or lever, to force down the upper bar 33 of a switch, which has a complemental contact bar 34.

The switch members 33, 34 have a spring action which tends to separate them. To insure certainty in the breaking of the contact between these switch members, the arm 32 of member 3, is provided with a notch or finger with which it engages the end of the spring arm 33, so that when the finger 23 engages the finger 30 of the switch-controlling lever, the upper member 33 of the switch will be forced to rise if, from any circumstances, its contact with its complemental member 34 became stuck. This switch controls the current which energizes the solenoid coil. The leads 35, 36, and 37 are parts of the solenoid circuit. These lead to any convenient source of electro-motive force.

The switch which controls the load circuit contains the pivoted bar 4 and the fixed bar 40. The leads 43 and 44 are leads of the load circuit. The bar 4 is pivoted at 42. A spring 41 is connected at one end with the outer or swinging end of the bar 4 and at its other end to any convenient point which is located so that when the switch 4 is thrown upward, or into disengaged position, the tension of the spring will tend to maintain it in this position until it is moved into contact by some outside force. This bar 4 is engaged by the fingers 25 and 26, carried by the extension rod 22 from the solenoid 2.

The switch operating fingers are so disposed along the rod 22 that the making and breaking of the load circuit will occur at points well inside the ends of the path of travel of the solenoid core, whereby the solenoid core will travel a certain distance beyond the point of making and breaking the load circuit, before it makes or breaks its energizing circuit. This action constitutes an over travel.

The fingers 23, 24, 25, and 26, or any equivalent members by which the circuits are controlled are intended to be adjustable along the path of travel and along the rod 22, so that the time of make and break for each circuit may be adjusted independently.

The type of dash pot or delaying mechanism shown in Figure 1 is found satisfactory when used on alternating currents. When, however, the device is to be used to control direct current it is desirable to secure a quicker and more sudden make and break in the load circuit, thereby reducing arcing, and the wastage of material caused thereby, to a minimum. For this reason, I prefer to provide a dash pot which is so constructed that it has a sudden increase of movement, just at the time of making and breaking the load circuit.

One means for securing this is shown in Figure 3. The cylinder 1 of the dash pot is provided with an outward bulge or peripheral channel of larger diameter at the point opposite the position of the dash pot piston 10 when the switch is opened and closed.

In the construction shown in Figure 1, as designed for use with alternating current, the controlling switches are placed outside the device. In the construction shown in Figure 3, which is more particularly designed for use with direct current, the switch controlling the load circuit is placed within the dash pot. In this construction 5, 5, represent the leads of the load circuit, which are each connected with a metal piece 50, which form parts of the switch.

These terminals, 50, 50, are connected within the oil of the dash pot by means of a disk 51 which is loosely mounted upon the rod 210, which forms an extension of the piston rod 21 carried by the solenoid core. Upon the lower end of this rod and below the disk 51, is secured a washer 213, or other means capable of engaging and lifting the disk 51, when the rod rises. This washer may also be adjustable in position on the rod 210.

The rod 210 should be insulated from the solenoid core, which may be done by securing a bar 211 of insulating material to the piston 10, and securing the rod 210 in this bar 211. A sheet 212 of insulation may be employed to separate the ends of rods 21 and 210.

With a construction of this kind the upward travel of the solenoid core from the position shown in Figure 3 permits the piston 10 to travel to a point approximately that indicated by the dotted lines before it engages the disk 51 to break the current. When the piston 10 gets to the point where the outward swell or channel 11 of the cylinder causes an enlargement of the space available for the flow around the edges of the piston disk, the resistance will be decreased and the solenoid core will increase the speed of its movement and will thus catch and quickly raise the disk 51 from contact with the terminals 50, so as to prevent arcing.

Similarly on the downward movement of the solenoid the piston will move slowly until it reaches the swell 11 in the cylinder and will then move with considerably increased speed downward, just at the time of the contact of the disk 51 with the terminals 50. The solenoid core will then continue its movement downward until the switch, which controls its energizing circuit, is closed, whereupon it will start the upward movement. The dash pot piston 10 and the solenoid core which is connected with it, are thus seen to have an over travel beyond the point of making and breaking the switch of the load circuit. In consequence, the load circuit remains on and off at alternate intervals which are determined in their duration by the adjustment of the parts. The period of closure may be lengthened or shortened relative to the period of break by adjusting the time of contact with the disk 51.

In Figures 4 and 5 are shown another type of means which may be employed for controlling the solenoid circuit. In this a wheel 6 is mounted to turn upon an arm 62 which sustains it alongside of the rod 22, which forms the exterior extension of the solenoid core. The two bars or fingers 25 and 26 carry pins 27 and 28, which project laterally in position to engage the projecting fingers or bosses 60 of the wheel 6. The wheel 6 forms one element of the switch, its projections 60 contacting with the spring bar 61, form the contact which closes the circuit. If the wheel be moved a distance equal to half the angle between successive projections 60, the circuit will be broken. The pin 27 carried by the lower bar 25, contacting with that one of the projections 60, which is at that time extending horizontally from the wheel, will turn the wheel a sufficient distance to break the circuit. The core will then drop and when it has dropped a sufficient distance the pin 28, carried by the other arm 26, will engage the corresponding projection at the opposite side of the wheel to advance the wheel another equal space, or sufficiently to contact the projection 60 at the other side of the wheel with the spring bar 61, whereupon the solenoid circuit is closed and the core will begin to rise.

In Figures 9 and 10 a modified type of structure is shown. This employs a movable bar 7 and a fixed bar 70, the latter preferably having a slight spring character. The bar 7 is pivoted at 71 and this pivot is provided with a spring or yielding construction which may be adjusted to provide sufficient friction to hold the bar 7 in whatever position it may be placed until it is moved therefrom by some outside influence. Such a means may consist of a spring washer 72, which may be clamped down, as by adjusting its holding screw, to give whatever friction is desired.

Another plan for doing the same thing is shown in Figure 11, this representing the end view of the device shown in Figure 1. In this construction a coil spring 73 is shown which is placed surrounding the pivot and back of the eccentric lever 3.

Figures 7 and 8 show the construction of the solenoid core which I prefer, and also of the field magnet 8. Both of these are preferably made of laminated iron.

What I claim as my invention is:

1. In an electric current controller, in combination, a solenoid, a solenoid circuit, a switch controlling the solenoid circuit and actuated to make and break said circuit at opposite ends of the stroke of the solenoid core, a load circuit switch and means whereby movement of the solenoid core opens and closes said switch at an intermediate point in the stroke of the solenoid core, and means for producing an acceleration in the movement of the solenoid core at the time of opening the load circuit switch.

2. In an electric current controller, in combination, a solenoid, a solenoid circuit, a switch controlling the solenoid circuit and actuated to make and break said circuit at opposite ends of the stroke of the solenoid core, a load circuit switch and means whereby the solenoid core opens and closes said latter switch at an intermediate point in the stroke of the solenoid core, and means for producing an acceleration in the movement of the solenoid core at the time of opening and closing the load circuit switch.

3. In an electric current controller, in combination, a solenoid, means for automatically reversing the movement of said solenoid core, a load circuit switch, means whereby the solenoid core opens and closes said latter switch at an intermediate point in the stroke of the solenoid core, and a dash pot having its piston connected to be moved by the solenoid core, the cylinder of the dash pot having an enlarged by-pass corresponding in position with the point of opening and closing the switch which controls the load circuit.

4. In an electric current controller, in combination, a solenoid, a solenoid circuit, a switch in the solenoid circuit, means for opening and closing said switch by the movement of the solenoid core, a dash pot cylinder alined with the solenoid, a load circuit switch within said cylinder and containing a removable member, an extension of the solenoid core passing through said switch member and having a slack connection therewith, and a dash pot piston connected with the said extension.

5. In an electric current controller, in combination, a solenoid, a switch in the solenoid circuit opened and closed by the movement of the solenoid core, a fluid chamber in line with the solenoid, a load circuit switch in the fluid of said chamber and controlling connections from the solenoid core to said switch containing a piston operating in the fluid in said chamber to produce a delaying action on the solenoid core.

6. In an electric current controller, in combination, a solenoid, a switch in the solenoid circuit opened and closed by the movement of the solenoid core, a load circuit switch, actuating connections from the solenoid core to the load circuit switch, a fluid dash pot, and actuating connections from the core to the dash pot piston, the cylinder of the dash pot having an enlarged by-pass opening at the point corresponding with the point of making and breaking the load circuit switch.

7. In an electric current controller, a solenoid, an oil cylinder alined with the solenoid, a rod forming an extension of the solenoid core and entering said cylinder, a piston carried by said rod within the oil, two fixed terminals of a load circuit within said oil, a bridging member for said terminals, and means for reciprocally moving said bridging member away from and towards said terminals.

8. In an electric current controller, a solenoid, an oil cylinder alined with the solenoid, a rod forming an extension of the solenoid core and entering said cylinder, a piston carried by said rod within the oil, two fixed terminals of a load circuit within said oil, a bridging member for said terminals, a rod extending from the piston rod and passing loosely through said bridging member and having a projection adapted to engage and lift said bridging member at a middle point in the travel of the piston.

9. In an electric current controller, a solenoid, an oil cylinder alined with the solenoid, a rod forming an extension of the solenoid core and entering said cylinder, a piston carried by said rod within the oil, two fixed terminals of a load circuit within said oil, a bridging member for said terminals, a rod extending from the piston rod and passing loosely through said bridging member and having a projection adapted to engage and lift said bridging member at a middle point in the travel of the piston and means for adjusting the stroke of the solenoid core to vary the relative position in the stroke of making and breaking the circuit by said bridging member.

Signed at Seattle, Washington, this 17th day of January, 1917.

JAMES C. ARNOLD.